Jan. 28, 1969     A. F. GAWRON     3,424,962
TRANSFORMER MEANS FOR A MULTI-PHASE FREQUENCY GENERATOR
Filed July 18, 1966
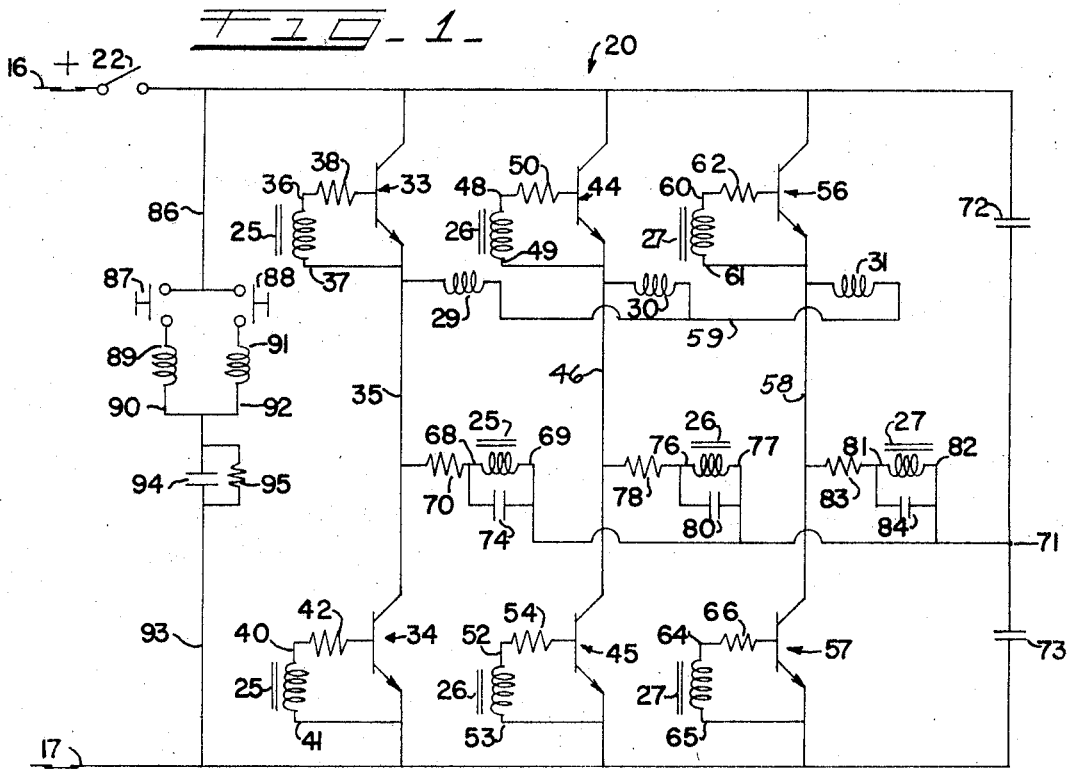
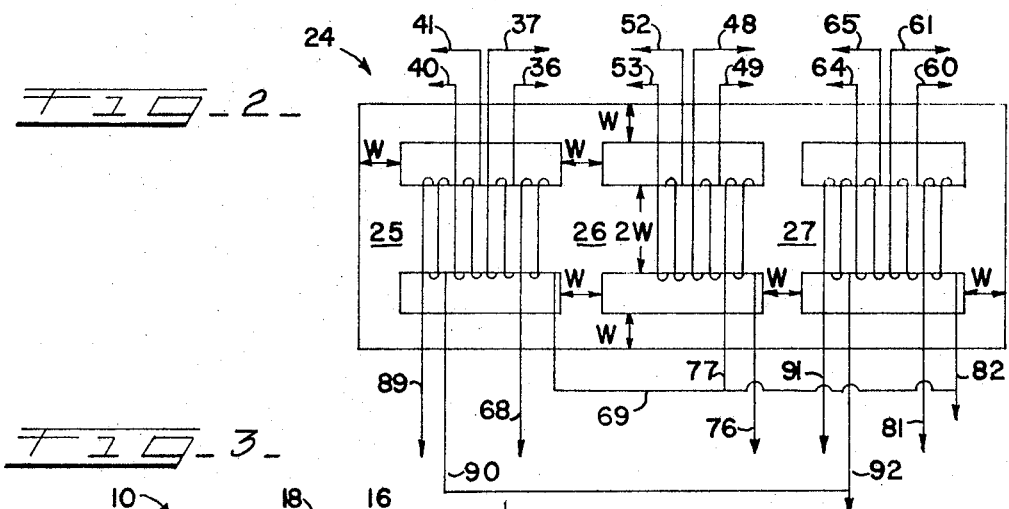
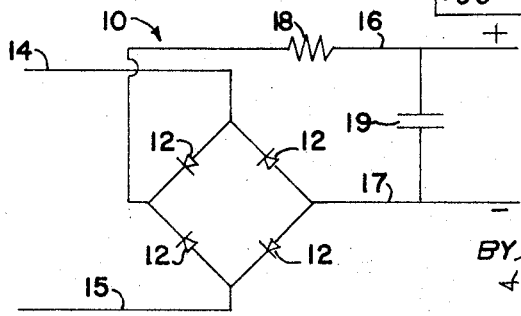
INVENTOR
ALEX F. GAWRON
ATT'YS.

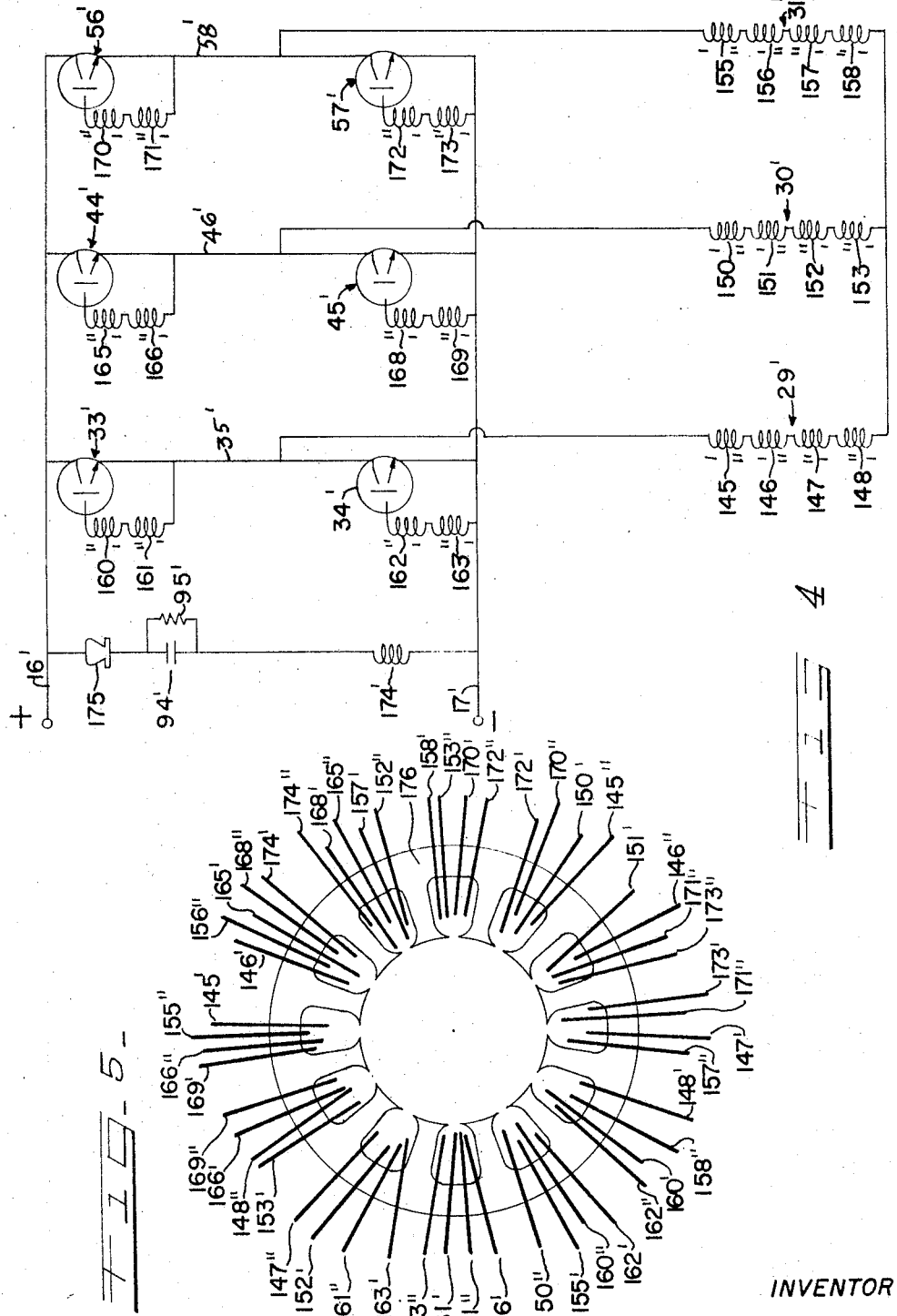

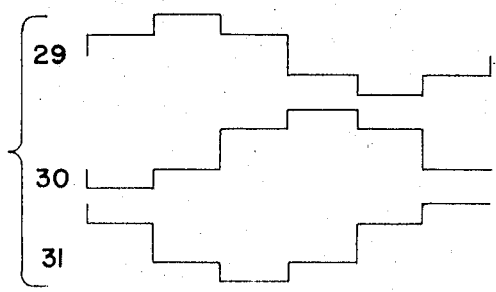
Fig. 6
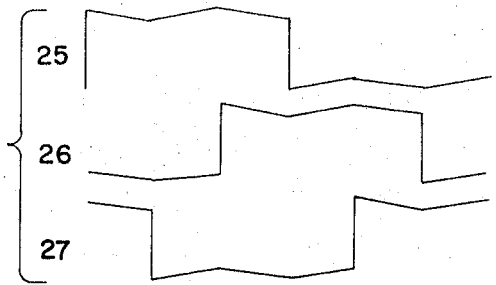
Fig. 7
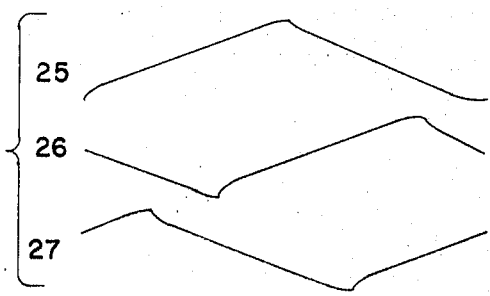
Fig. 8
Fig. 9
| 33 | ON | ON | ON | OFF | OFF | OFF |
| 34 | OFF | OFF | OFF | ON | ON | ON |
| 44 | OFF | OFF | ON | ON | ON | OFF |
| 45 | ON | ON | OFF | OFF | OFF | ON |
| 56 | ON | OFF | OFF | OFF | ON | ON |
| 57 | OFF | ON | ON | ON | OFF | OFF |
← ONE CYCLE →
INVENTOR
ALEX F. GAWRON
BY Dreist, Lockwood, Greenawalt & Dewey
ATT'YS.

United States Patent Office 3,424,962
Patented Jan. 28, 1969

3,424,962
TRANSFORMER MEANS FOR A MULTI-PHASE FREQUENCY GENERATOR
Alex F. Gawron, Chicago, Ill., assignor to Skil Corporation, Chicago, Ill., a corporation of Delaware
Filed July 18, 1966, Ser. No. 566,101
U.S. Cl. 318—138                              8 Claims
Int. Cl. H02k 29/00

ABSTRACT OF THE DISCLOSURE

The multi-phase, frequency generator, which provides a multi-phase alternating current in the stator windings of an induction-type motor, includes a plurality of legs each defined by a pair of transistors connected in push-pull relation. The control windings for the transistors are associated with a saturable core transformer, the phases of the saturable core transformer being magnetically coupled. This transmformer serves as the sole means for synchronizing and spacing the phases of the alternating current generated by the frequency generator.

---

The present invention relates to a frequency generator for generating a multi-phase, high frequency, alternating current from a direct current input, and more particularly the present invention relates to new and improved saturable core transformer means for such a frequency generator.

A primary object of the present invention is the provision of a multi-phase frequency generator including new and improved saturable core transformer means, which transformer means has a plurality of phases magnetically coupled with each other thereby acting to synchronize and space the phases of alternating current at the frequency generator output.

Another object of the present invention is the provision of a frequency generator according to the foregoing object wherein each phase or leg thereof consists of a pair of semiconductor switch devices in push-pull relation, and wherein such transformer means serves to bias each of the switch devices in a conducting condition for one half of the cycle and in a non-conducting condition for the remaining one half of the cycle.

Another object of the present invention is to provide a new and improved frequency generator of the type described in association with a motor stator, which generator includes transformer means having a plurality of phases magnetically coupled with each other thereby acting to synchronize and space the phases of alternating current in the stator windings, such transformer means being defined by transformer windings wound on the core of the stator in inductive relation with the stator windings.

Still another object of the present invention is the provision of new and improved means for initiating switching of swich devices in a mult-phase frequency generator of the type described including a plurality of phases or legs each consisting of a pair of semi-conductor switch devices arranged in push-pull relation, such switch devices being biased into conducting and non-conducting conditions in predetermined sequence by saturable core transformer means.

Another object of the present invention is to provide a new and improved frequency generator which will operate from a high ripple direct current source having an instantaneous voltage which may vary considerably.

Still another object of the present invention is to provide a frequency generator which is significantly smaller, simpler and is less costly than prior art generators.

These and other objects and advantages of the invention will become apparent from the following specification disclosing a preferred embodiment of the invention shown diagrammatically in the accompanying drawings wherein:

FIG. 1 is a circuit diagram showing the frequency generator of the present invention associated with a load in the form of stator windings;

FIG. 2 is a diagrammatic view of the transformer forming part of the frequency generator;

FIG. 3 is a circuit diagram of rectifying means used to convert line or house alternating current to direct current;

FIG. 4 is a circuit diagram showing a modified frequency generator and motor stator arrangement;

FIG. 5 is a diagrammatic view showing the motor stator and the arrangement of the various windings or coils in the FIG. 4 circuit;

FIG. 6 is a graphical representation of the voltages in the stator of a motor with which the frequency generator of this invention may be associated;

FIG. 7 is a graphical representation of the voltages in the primary windings of each phase of the transformer;

FIG. 8 is a graphical representation showing flux change in each leg of the transformer during a cycle of operation; and FIG. 9 is a table showing the sequence of switching for the transistors of the frequency generator.

The frequency generator according to the present invention may be powered from line or house alternating current, that is, alternating current at 117 volts, 60 cycles per second. As the frequency generator, which operates in the manner of an inverter, converts direct current to a multi-phase, high frequency, alternating current, suitable rectifying means are provided for changing the line alternating current to direct current.

Such rectifying means are shown in FIG. 3 and are generally designated 10. The rectifier 10 will be seen to include a full-wave bridge rectifier including four diodes 12 connected across lines 14 and 15; these lines represent conventional single phase line current, which in the United States is in the order of 117 volts at 60 cycles per second. Extending from the bridge rectifier are direct current lines 16 and 17, the former being positive and the latter being negative. A resistor 18 is connected in line 16 and a capacitor 19 is connected across the lines 16, 17 in parallel with the bridge rectifier. It will be apparent that the rectifying means 10 changes the line alternating current to direct current in the lines 16 and 17. The capacitor 19 acts to reduce the ripple or voltage fluctuation of the direct current, which ripple results from rectifying the alternating current in the lines 14, 15 by the full-wave bridge. It will be understood that the values of the resistor 18 and capacitor 19 can be changed as necessary to accommodate input voltage different from 117 volts, which might be encountered in foreign countries. It will also be understood that lines 14, 15 may be connected to a D.C. source in which case direct current will still be supplied to the lines 16, 17.

Referring now to FIG. 1, the frequency generator of the present invention, generally designated 20, is shown in association with a load in the form of stator coils or windings to be identified hereinbelow. The frequency generator and such stator coils together constitute a power system which is disclosed and claimed in application, Ser. No. 566,103, filed on even date herewith. The frequency generator has a direct current input or supply consisting of the aforementioned lines 16 and 17. An on-off switch 22 may be provided in one of the direct current input lines, such as the line 16. The generator 20 is associated with and controlled by a unique saturable core transformer 24, as best illustrated in FIG. 2, such transformer consisting of three phases or legs 25, 26 and 27. It will be understood that the transformer has a number of phases or legs equal in number to the number of legs or phases of the frequency generator.

In FIG. 1, each leg of the transformer is shown in three separate sections to facilitate illustration of the associated inverter components. Still referring to FIG. 1, the output or load associated with the frequency generator is represented by coils or winding designated 29, 30 and 31. Such windings may constitute Y connected stator windings of an alternating current induction type motor.

At this time it should be said that the multiphase frequency generator of this invention is not to be limited to any particular number of phases, three phases being preferable and being shown for purposes of illustration. Alternating current is generated in proper phase relationship, this phase relationship being synchronized and spaced by the transformer 24 as will be explained hereinbelow, in the windings 29, 30 and 31 by the frequency generator 20 which primarily consists of a plurality of legs each defined by a pair of solid state switch devices, such as transistors, each pair of transistors being arranged in push-pull relation.

A first pair of transistors 33 and 34 of the NPN type are connected across direct current input lines 16 and 17 and are connected together in emitter to collector relation by a line 35, which line is connected to the winding or coil 29. It will be understood that the frequency generator can be adapted to have a pair of PNP type transistors as well as a pair of transistors consisting of one NPN type transistor and one PNP type transistor, for each phase or leg. Transistor 33 is switched on and off by a secondary transformer coil 36–37, the end of the coil represented by 37 being connected to the line 35 and the end of the secondary transformer coil indicated at 36 being connected to the base of the transistotr 33 through a resistor 38. In like manner, transistor 34 is switched on and off by secondary transformer coil 40–41, the end 41 being connected to a common connection between the emitter of this transistor and the line 17 and the end 40 being connected to the base of this transistor through a resistor 42.

Alternating current is generated in the winding 30 by another pair of transistors 44, 45. These transistors are connected across the direct current input lines 16 and 17 and are connected together in emitter to collector relation by a line 46, which line is connected to one end of the winding 30. Transistor 44 is switched both on and off by a secondary transformer coil 48–49 connected in series with a resistor 50 between the line 46 and the base of the transistor 44. Similarly, transistor 45 is controlled by a secondary transformer winding 52–53 connected in series with a resistor 54 between the base of transistor 45 and a connection common to the emitter of this transistor and the direct current line 17.

Alternating current is generated in winding 31 by a pair of transistors 56–57 connected across the direct current input lines and connected together in emitter to collector relation by a line 58, the latter being connected to one end of the stator winding 31. The other end of this output winding is connected to a line 59 common to the other two output windings. Transistor 56 is controlled or switched to conducting or non-conducting conditions by a secondary transformer winding 60–61 connected in series with a resistor 62 between the base of the transistor 56 and the line 58. In like manner, transistor 57 is switched on and off by a secondary transformer winding 64–65 connected in series with a resistor 66 between the base of transistor 57 and between a connection common to the emitter of the transistor 57 and the direct current line 17.

Secondary transformer coils 36–37 and 40–41, which are each wound on the leg or phase 25 of the transformer 24 as seen in FIG. 2, are controlled from a primary transformer winding 68–69 also wound on the leg 25 of the transformer. The end of this coil or winding represented at 68 is connected through a resistor 70 to line 35 which is connected between the transistors 33 and 34, and the other end of this coil represented at 69 is connected to a junction 71 in a line connecting capacitors 72, 73 across the D.C. input lines. Capacitors 72, 73 smooth or filter the voltage at junction 71 so the same is always approximately one half the applied input voltage. A capacitor 74 is connected in parallel relation with the primary transformer winding 68–69. The capacitor 74 prevents an overlap between the conductive paths which are set up by the alternately conducting transistors 33, 34. In other words, the capacitor 74 slows down the rate of change between one conductive path and the other, as will be referred to hereinbelow.

Secondary transformer coils 48–49 and 52–53 are controlled by a primary transformer winding or coil 76–77, all of these coils being wound on the leg 26 of the saturable core transformer 24. The end of this winding represented by numeral 76 is connected to the line 46 through a resistor 78, and the other end of this winding represented at 77 is connected to the line which extends to the junction 71. A capacitor 80 is connected in parallel with the transformer coil 76–77, this capacitor serving to prevent overlap of the conductive paths set up by the alternate switching of transistors 44, 45.

Secondary transformer windings 60–61 and 64–65 are controlled from a primary transformer winding 81–82, all of these coils being wound on the leg 27 of the transformer 24. The end of this winding represented by 81 is connected to the line 58 through a resistor 83, the other end of this coil being connected to the line which extends to the junction 71. A capacitor 84 is connected in parallel with the primary transformer coil 81–82 to prevent overlap between the conductive paths set up by the alternately switched transistors 56, 57.

The frequency generator 20 includes a unique starting circuit consisting of a line 86 connecting the D.C. line 16 to a common connection between a forward starting switch 87 and a reverse starting switch 88. These switches are connected to respective forward and reverse starting coils 89–90 and 91–92. As noted in FIG. 2, coil 89–90 is wound on leg 25 of the transformer and coil 91–92 is wound on leg 27 of the transformer. The coil ends 90, 92 are connected to a common connection which is in turn connected to the D.C. line 17 by a line 93 having a capacitor 94 and parallel arranged resistor 95 connected therein.

Assuming the windings 29, 30 and 31 constitute the windings of a three phase, induction-type alternating current motor, which windings are wound on a stator core associated with a rotor (not shown), the operation of the above described frequency generator is as follows:

To start the frequency generator and thereby the motor, the switch 22 is closed followed by closing of either the forward start switch 87 or the reverse start switch 88, depending on the direction of rotation desired. Assuming that the forward switch 87 is momentarily closed, a pulse of current flows through the forward starting coil 89–90 on the transformer leg 25. This pulse initiates the transformer fluxes in each leg of the transformer so that self-oscillation is established. These fluxes cause current flow in a predetermined direction in the transformer secondary windings, and such current flow causes one of the transistors in each generator leg to be biased on. As shown in FIG. 9, transistors 33, 45 and 56 are biased on substantially simultaneously. If reverse starting switch 88 has been closed, a pulse would have flowed through coil 91–92 to set up fluxes in the reverse direction thereby in turn establishing self-oscillation in a reverse direction. The capacitor 94 passes a predetermined pulse through the starting coil, and the parallel connected resistor 95 causes discharge of this capacitor for the next starting cycle.

The six transistors in the frequency generator are operated as on-off switches. That is, when a transistor is biased on, sufficient base current is provided to maintain the transistor in a saturated condition, i.e., easy current conduction from collector to emitter, and when a transistor is biased off, the base drive voltage is reversed, so that the transistor is capable of blocking the applied voltage, i.e., essentially zero current from collector to emitter.

The transformer and its associated circuitry responds to the voltages established by the transistors and in turn controls these transistors. Each phase of the transformer operates on a magnetic saturation principle. By way of illustration, when transistor 33 is on, the primary coil 68–69 of leg 25 of the saturable core transformer has essentially a square wave applied to it (FIG. 7), and the magnetic flux in this leg changes in approximately a linear manner (FIG. 8). When the square wave is applied to this leg of the transformer, a flux is induced in the secondary windings 36–37 and 40–41 thereby impressing a positive voltage to the base transistor 33 for biasing it on and impressing a negative voltage to the base of transistor 34 for biasing it off. When the primary leg 25 becomes saturated with flux, the output in the secondary transformer windings decreases, thereby diminishing the bias at the base of the transistor 33 tending to turn the same off, which diminishes the voltage applied to the primary winding of the transformer leg 25. This diminishes the ampere turns in this primary coil section thereby causing the flux in leg 25 to diminish. This diminution of flux in the leg 25 initiates voltages in the secondary transformer windings, which voltages are of opposite polarity to the voltages mentioned above, thereby causing transistor 34 to be biased on and transistor 33 to be biased off. The reversal of the conducting conditions of the transistors 33, 34 impresses a voltage on the primary winding of the leg 25 which is opposite to that mentioned above and now the flux in this leg of the transformer is driven to saturation in the opposite direction whereupon another cycle is commenced.

Considered another way, when voltage is applied to the primary windings of each leg or phase of the saturable core transformer 24, current begins to flow and the iron or core starts to carry a magnetic flux. The current in the primary windings and the magnetic flux start to increase in amplitude until the iron or core becomes saturated.

While the flux is changing in each leg of the transformer, the two associated secondary windings are generating voltage which depend on the rate of change of the flux. The secondary windings are connected so that as one is generating a positive drive voltage for the associated transistor, say the transistor 33 for example, the other secondary coil is generating a negative drive voltage to the transistor 34. The result is that transistor 33 is biased on and transistor 34 is biased off. When the iron or core in the transformer is saturated the flux change ceases, and then both secondary coils of each transformer leg or phase have no voltage output. In this condition, the transistors are not provided with base drive voltage and are therefore in a nonconducting state.

Turning off transistor 33 cuts off the supply of current to the primary coil of the transformer leg 25 and accordingly the flux which was built up in the core of this leg starts to diminish thereby causing a change in the direction of magnetic flux which causes voltages in the secondary windings to be generated but in a polarity opposite to the polarity just mentioned. This causes transistor 33 to remain off and transistor 34 to be biased on. The sequence for the remainder of the half cycle is the same as just explained except that all polarities are reversed. It will be understood that the operation of the other legs of the frequency generator are the same as the operation of the leg including the transistors 33 and 34. It will be apparent that the transformer 24 provides the driving power to the transistors. Also, the transformer 24 provides what might be termed a logic function since the transformer provides the proper switching sequence of the transistors, or in other words, the transformer synchronizes and spaces the phases of alternating current at the output of the generator. This last mentioned objective is achieved since the various legs or phases of the transformer 24 are magnetically coupled with each other. At this time it should be said that the turns or windings of each of the three primary coils are equal. Also, the turns of all the secondary windings are equal. The proper switching sequence of the transistors is achieved not only by the arrangement of windings on the transformer but also by the geometry or physical construction of the transformer core itself.

As noted in FIG. 2, the core sections around which the coils are wound have a width twice as great as the width of the remaining core portions. The core of the transformer may be considered as having a uniform thickness. The just referred to relationships of the windings and the arrangement of the transformer core together impose a time period of flux change which is equal from one phase to the next. Or in other words, the time required for the flux to change from one direction of saturation to the other is equal in each of the legs 25, 26 and 27 of the saturable core transformer 24. Since transformer legs 25 and 27 each share a common flux path with leg 26, the time relationships between the fluxes must be such that at any instant of time the fluxes in the common path add up to a value no greater than the saturation value of the flux in the core of the transformer 24. Because of all these conditions, the fluxes assume conditions in time which tend to make them equally displaced from one another, thereby bringing about switching of the transistors in the proper sequence for synchronizing and properly spacing the phases of alternating current at the frequency generator output.

It will be understood that the various transformer windings serve to switch the transistors from their different conducting conditions to establish a three phase, high frequency, alternating current in the stator windings 29–31 so as to operate the induction-type motor. The voltages in the stator windings are graphically represented in FIG. 6. The transistor switching sequence for one cycle of operation is shown in FIG. 9. The transformer 24, which has the legs or phases thereof magnetically coupled with each other, serves as the sole means for controlling the sequence of switching of the transistors and in so doing also serves to synchronize and properly space the phases of alternating current, thereby obviating special or extra means to achieve synchronization.

The saturable core transformer adapts the associated frequency generator to operate efficiently from a high ripple direct current source having an instantaneous voltage value which may vary considerably, as may be the case with the rectifying means 10. Since the frequency generator can tolerate relatively high ripple in the direct current source, the capacitor 19 can be relatively small.

A modified frequency generator and stator arrangement is illustrated in FIGS. 4 and 5. The modified generator operates in essentially the same manner as the aforedescribed frequency generator, the main difference being that the modified generator does not include a separate transformer. The various transformer coils are wound on the stator of an associated motor of the induction type in inductive relation with the stator windings; therefore a portion of the stator core actually serves as a transformer core, and the stator windings serve as primary transformer coils or windings. In FIG. 4, the various components corresponding to the aforementioned components in FIG. 1 are indicated by the prime form of numeral.

Referring now to FIG. 4, stator winding 29' consists of series connected windings 145–148, inclusive. Similarly, stator winding 30' consists of series connected windings 150 through 153. Finally, stator winding 31' includes series connected windings 155–158, inclusive.

Transistor 33' is biased either on or off by series connected coils 160 and 161, connected between the base of transistor 33' and the line 35'. Likewise, transistor 34' is controlled by coils 162, 163 connected in series between the base of such transistor and the D.C. line 17'. Series connected coils 165, 166 extend between the base of transistor 44' and the line 46', and in like manner, coils 168 and 169 are arranged in series between the base of transistor 45' and the line 17'. Transistor 56' is controlled by coils 170 and 171 connected in series between the base of this transistor and the line 58'. Finally, transistor 57' is controlled by windings 172, 173 connected in series between the base of transistor 57' and the line 17'.

A starting circuit includes a starting coil 174 in a line between the input lines 16', 17', which line also includes a diode 175 in addition to the capacitor 94' and resistor 95'. Such starting circuit may include a reverse starting coil and the forward and reverse starting switches as in the FIG. 1 converter. The prime and double prime markings in FIG. 4 indicate the ends of the windings.

FIG. 5 diagrammatically illustrates the locations of the various windings on a stator 176 of an induction motor of the type referred to herein, the ends of the windings being indicated by the prime and double prime form of numeral. As mentioned above, the operation of the modified frequency generator in generating alternating current in the proper phase relation in the motor stator is the same as the operation of the generator of FIG. 1. The several legs or phases of the transformer are magnetically coupled with each other as each is formed on the stator core, a unitary structure.

Thus, the present invention provides a new and improved frequency generator. The saturable core transformer forming a part of the generator has the various legs or phases thereof magnetically coupled with each other thereby synchronizing and spacing the alternating current at the output of the frequency generator in an improved manner which obviates special or separate synchronizing components and circuits. Further, the frequency generator includes an improved starting circuit to initiate switching of the transistors in a predetermined sequence. The modified generator arrangement has particular utility in driving an alternating current induction-type motor.

While the invention has been shown in but one form, it will be obvious to those skilled in the art that it is not to be so limited. On the contrary, the invention is susceptible of various forms and modifications without departing from the spirit and scope of the appended claims.

I claim:

1. In combination, a multi-phase motor stator and a multi-phase frequency generator therefor, said stator having sets of windings defining respective motor phases, said frequency generator being adapted to be connected to a source of direct current and to said stator windings to effect in the latter a multi-phase, high frequency, alternating current, said frequency generator including a plurality of legs with each leg being connected across the direct current source, each of said legs consisting of a pair of solid state switch devices arranged in push-pull relation, said sets of stator windings having a common connection and being connected to respective frequency generator legs, saturable core transformer means having a plurality of phases equal in number to the number of legs, each phase of said transformer means having a pair of secondary winding means respectively connected with the pair of switch devices of the associated frequency generator leg for alternately biasing such switch devices into conducting and non-conducting conditions in response to flux change in such phase of the transformer means, the phases of said transformer means being magnetically coupled with each other thereby serving as the sole means for synchronizing and spacing the phases of the alternating current at the frequency generator output.

2. The combination according to claim 1 wherein said transformer means has the windings thereof arranged for biasing each switch device in a conductive condition for one half of each cycle and in a non-conducting condition for the remaining one half of the cycle.

3. The combination according to claim 1 wherein each of said switch devices comprises a transistor.

4. The combination according to claim 1 wherein all of the winding means of each phase of the transformer means are wound on the core of said stator in inductive relation with respective sets of stator windings, the sets of stator windings also serving as the primary winding means of said transformer means.

5. In a multi-phase frequency generator adapted to be connected to a source of direct current and to effect at a multi-phase output a multi-phase alternating current, which frequency generator includes a plurality of legs each connected across the direct current source and to the output, each of said legs consisting of solid state switch means arranged in push-pull relation, and multi-phase saturable core transformer means for synchronizing and spacing the phases of alternating current at the output, the improvement comprising, starting means for initiating switching of said switch means in a predetermined sequence, said starting means including a line connected across the direct current source in parallel with said legs, said line including a serially connected starting winding, which starting winding is wound on one of the phases of said transformer means, whereby a flow of current through said starting winding induces fluxes in each phase of the transformer means for biasing certain of said switch means into a conducting condition.

6. The improvement according to claim 5 further defined by a capacitor and a resistor connected in parallel with each other in said line.

7. The improvement according to claim 5 wherein each of said switch devices comprises a transistor.

8. The improvement according to claim 5 wherein each of said frequency generator legs consists of a pair of switch devices and wherein said starting means substantially simultaneously initiates conduction of a selected switch device in each leg.

References Cited

UNITED STATES PATENTS

| 2,970,301 | 1/1961 | Rochelle | 331—113 |
|---|---|---|---|
| 3,175,167 | 3/1965 | Lloyd | 321—45 X |
| 3,297,928 | 1/1967 | Von Delden | 318—138 |
| 2,917,714 | 12/1959 | Jensen | 321—8 |

JOHN F. COUCH, Primary Examiner.

W. H. BEHA, JR., Assistant Examiner.

U.S. Cl. X.R.

318—231; 321—5; 331—45